US009430555B2

(12) United States Patent  
Duncan et al.

(10) Patent No.: US 9,430,555 B2  
(45) Date of Patent: Aug. 30, 2016

(54) REFORMATTING TEXT IN A DOCUMENT FOR THE PURPOSE OF IMPROVING READABILITY

(75) Inventors: Gregory Lyle Duncan, Fraser (AU); Christopher Colin Stephen, Paddington (AU)

(73) Assignee: Accessible Publiahing Systems Pty Ltd, Sydney (AU)

( * ) Notice: Subject to any disclaimer, the term of this patent is extended or adjusted under 35 U.S.C. 154(b) by 1208 days.

(21) Appl. No.: 12/260,063

(22) Filed: Oct. 28, 2008

(65) Prior Publication Data

US 2009/0132384 A1    May 21, 2009

Related U.S. Application Data

(63) Continuation-in-part of application No. 10/551,118, filed as application No. PCT/AU2004/000341 on Mar. 22, 2004, now Pat. No. 8,719,696.

(30) Foreign Application Priority Data

Mar. 24, 2003 (AU) ................................ 2003901428

(51) Int. Cl.  
*G06F 17/00* (2006.01)  
*G06F 17/30* (2006.01)  
*G06Q 30/06* (2012.01)  
*G06F 17/21* (2006.01)

(52) U.S. Cl.  
CPC ..... *G06F 17/3061* (2013.01); *G06F 17/30914* (2013.01); *G06Q 30/0601* (2013.01); *G06F 17/211* (2013.01)

(58) Field of Classification Search  
CPC ................................................... G06F 17/211

USPC ........................................................ 715/224  
See application file for complete search history.

(56) References Cited

U.S. PATENT DOCUMENTS

| | | |
|---|---|---|
| 4,193,212 A | 3/1980 | Al-Kufaishi |
| 4,713,008 A | 12/1987 | Stocker et al. |
| 5,057,020 A | 10/1991 | Cytanovich |

(Continued)

FOREIGN PATENT DOCUMENTS

| | | |
|---|---|---|
| AU | 2010224440 | 10/2010 |
| WO | WO 00/72235 A1 | 11/2000 |
| WO | WO 02/094566 A1 | 11/2002 |

OTHER PUBLICATIONS

"Sams Teach Yourself Microsoft Word 2000," Peter Aitken, 1999, Sams, attached pp. 1-43.*

(Continued)

*Primary Examiner* — Andrew McIntosh  
(74) *Attorney, Agent, or Firm* — Stoel Rives LLP

(57) ABSTRACT

Systems and methods are disclosed for producing documents in a specialized format adapted to aid readability, such as word-recognition and word-processing capabilities. Marked-up documents stored in a repository are created by marking up previously unmarked-up documents according to one or more schemas, to include explicit structural information that corresponds to implicit structural information originally contained in the unmarked-up documents. A user may request a specially formatted document by selecting one of a number of available stored document formats including formatting rules or parameters to be applied to a selected one of the marked-up documents.

18 Claims, 20 Drawing Sheets

(56) References Cited

U.S. PATENT DOCUMENTS

| | | | |
|---|---|---|---|
| 5,263,132 A * | 11/1993 | Parker et al. ............ | 715/207 |
| 5,748,805 A | 5/1998 | Withgott et al. | |
| 5,778,398 A | 7/1998 | Nagashima et al. | |
| 5,806,079 A | 9/1998 | Rivette et al. | |
| 5,987,480 A | 11/1999 | Donohue et al. | |
| 6,014,662 A | 1/2000 | Moran et al. | |
| 6,029,182 A | 2/2000 | Nehab et al. | |
| 6,167,409 A | 12/2000 | DeRose et al. | |
| 6,330,529 B1 | 12/2001 | Ito | |
| 6,336,124 B1 | 1/2002 | Alam et al. | |
| 6,363,337 B1 | 3/2002 | Amith | |
| 6,397,231 B1 | 5/2002 | Salisbury et al. | |
| 6,405,162 B1 | 6/2002 | Segond et al. | |
| 6,442,523 B1 * | 8/2002 | Siegel .................... | 704/270 |
| 6,591,289 B1 | 7/2003 | Britton | |
| 6,678,864 B1 | 1/2004 | Tsai | |
| 6,725,424 B1 | 4/2004 | Schwerdfeger et al. | |
| 6,738,951 B1 | 5/2004 | Weiss et al. | |
| 6,829,746 B1 | 12/2004 | Schwerdfeger et al. | |
| 6,857,102 B1 | 2/2005 | Bickmore et al. | |
| 6,995,860 B2 | 2/2006 | Roztocil et al. | |
| 7,035,837 B2 * | 4/2006 | Reulein et al. | |
| 7,249,318 B1 | 7/2007 | Corell et al. | |
| 7,260,777 B2 | 8/2007 | Fitzsimons et al. | |
| 7,475,337 B1 | 1/2009 | Huang | |
| 7,865,567 B1 * | 1/2011 | Hendricks et al. ........ | 709/214 |
| 2001/0003039 A1 * | 6/2001 | Marshall ................ | 434/167 |
| 2001/0032217 A1 | 10/2001 | Huang | |
| 2001/0051875 A1 * | 12/2001 | Miller et al. ............ | 705/1 |
| 2002/0015179 A1 | 2/2002 | Igarashi et al. | |
| 2002/0019786 A1 * | 2/2002 | Gonzalez et al. ........ | 705/28 |
| 2002/0065852 A1 | 5/2002 | Hendrickson et al. | |
| 2002/0107891 A1 | 8/2002 | Leamon et al. | |
| 2002/0111963 A1 | 8/2002 | Gebert et al. | |
| 2002/0124026 A1 | 9/2002 | Weber | |
| 2002/0138521 A1 | 9/2002 | Sharp | |
| 2002/0143816 A1 | 10/2002 | Geiger et al. | |
| 2003/0023634 A1 | 1/2003 | Justice et al. | |
| 2003/0033305 A1 | 2/2003 | O'Connor et al. | |
| 2003/0037038 A1 | 2/2003 | Block et al. | |
| 2003/0040926 A1 | 2/2003 | Milton | |
| 2003/0144961 A1 | 7/2003 | Tharaken et al. | |
| 2003/0154071 A1 | 8/2003 | Shreve | |
| 2003/0212957 A1 | 11/2003 | Graham et al. | |
| 2003/0229608 A1 | 12/2003 | Reynar et al. | |
| 2003/0236659 A1 | 12/2003 | Castellanos | |
| 2004/0049399 A1 * | 3/2004 | Familian et al. .......... | 705/1 |
| 2004/0049736 A1 | 3/2004 | Al-Azzawe et al. | |
| 2004/0143430 A1 * | 7/2004 | Said et al. .............. | 704/2 |
| 2004/0146199 A1 | 7/2004 | Berkner et al. | |
| 2004/0172594 A1 | 9/2004 | Jones et al. | |
| 2004/0191731 A1 * | 9/2004 | Stork .................... | 434/180 |
| 2004/0199876 A1 | 10/2004 | Ethier et al. | |
| 2004/0218451 A1 | 11/2004 | Said et al. | |
| 2004/0236566 A1 | 11/2004 | Simske | |
| 2005/0091581 A1 | 4/2005 | Bezrukov et al. | |
| 2005/0091588 A1 | 4/2005 | Ramarao et al. | |
| 2005/0102143 A1 | 5/2005 | Woodward | |
| 2005/0108630 A1 | 5/2005 | Wasson et al. | |
| 2005/0251735 A1 | 11/2005 | Dunietz et al. | |
| 2005/0251739 A1 | 11/2005 | Shur et al. | |
| 2005/0273701 A1 | 12/2005 | Emerson et al. | |
| 2005/0273704 A1 | 12/2005 | Dunietz et al. | |
| 2006/0053151 A1 | 3/2006 | Gardner et al. | |
| 2006/0088805 A1 | 4/2006 | Pitkethly | |
| 2007/0022131 A1 | 1/2007 | Duncan et al. | |
| 2007/0182990 A1 | 8/2007 | Stephen et al. | |

OTHER PUBLICATIONS

Lehtonen et al., A Dynamic User Interface for Document Assembly, 2002, ACM, DocEng '02, Nov. 8-9.*

Canfora et al., "A Visual Approach to Define XML to FO Transformation", 2002, ACM, pp. 563-570.

Giannetti, Fabio, FOA: An XSL-FO Authoring Tool, Hewlett-Packard Co., May 25, 2001, 11 pages.

Giannetti, Fabio, XSL-FO 2.0: Automated Publishing for Graphic Documents, ACM, Proceedings of the 2009 Symposium on Document Engineering (Doc Eng '09), Dec. 16-18, 2009, 2 pages.

Hardy, Matthew R. B. et al., Mapping and Displaying Structural Transformations Between XML and PDF, ACM, Proceedings of the 2002 Symposium on Document Engineering (Doc Eng '02), Nov. 8, 2002, 8 pages.

EBookMall, http://web.archive.org/web/20030702213315/www.ebookmall.com/choose-format/, archived Jul. 22, 2003, retrieved on Apr. 6, 2004, 8 pages.

International Search Report for priority International Application No. PCT/AU2004/000341, dated Apr. 22, 2004, 3 pages.

International Preliminary Report on Patentability for International Application No. PCT/AU2004/000341, dated Oct. 1, 2005, 8 pages.

Encelle, et al., Adapting Presentation and Interaction with XML Documents to User Preferences, 2004, ICCPH 2004: Computers Helping People with Special needs Conference, Sprinher, Lecture Notes in Computer Science, vol. 3118, pp. 143-150.

Specifications for the Digital Talking Book, published in 2002 by the US National Information Standards Organisation, Bethesda, Maryland 20814 (ISBN: 1-880124-52-1).

Daisy Consortium. The Daisy 2.0 specification is based on HTML, and version 2.01, published in Feb. 2001 (www.daisy.org/publication/specifications/daisy_202.html).

Campbell et al., "XML Schema", SIGMOD Record, 2003, pp. 96-101.

IP Australia, Examiner's First Report on related Australian Patent Application No. 2010224440, Feb. 22, 2012, 3 pages.

Notice of Allowance and allowed claims, U.S. Appl. No. 10/551,118, dated May 13, 2014, 14 pgs.

Amendment, U.S. Appl. No. 10/551,118, dated Jan. 10, 2014, 11 pgs.

* cited by examiner

```xml
<pbbook type="novel" xmlns:xsi="http://www.w3.org/2001/XMLSchema-instance"
xsi:noNamespaceSchemaLocation="E:\LEX\CVT\pbnovel.xsd">
    <head>
        <title>The Time Machine</title>
        <author>H G Wells</author>
    </head>
    <body>
        <chapter>
            <head>
                <chap_title>I</chap_title>
            </head>
            <body>
                <para number="2">The Time Traveller (for so it will be convenient to speak of him) was expounding a recondite matter to us. His grey eyes shone and twinkled, and his usually pale face was flushed and animated. The fire burned brightly, and the soft radiance of the incandescent lights in the lilies of silver caught the bubbles that flashed and passed in our glasses. Our chairs, being his patents, embraced and caressed us rather than submitted to be sat upon, and there was that luxurious after-dinner atmosphere when thought roams gracefully free of the trammels of precision. And he put it to us in this way—marking the points with a lean forefinger—as we sat and lazily admired his earnestness over this new paradox (as we thought it:) and his fecundity.</para>
                <para number="3">'You must follow me carefully. I shall have to controvert one or two ideas that are almost universally accepted. The geometry, for instance, they taught you at school is founded on a misconception.'</para>
                <para number="4">'Is not that rather a large thing to expect us to begin upon?' said Filby, an argumentative person with red hair.</para>
                <para number="5">'I do not mean to ask you to accept anything without reasonable ground for it. You will soon admit as much as I need from you. You know of course that a mathematical line, a line of thickness NIL, has no real existence. They taught you that? Neither has a mathematical plane. These things are mere abstractions.'</para>
                <para number="6">'That is all right,' said the Psychologist.</para>
                <para number="7">'Nor, having only length, breadth, and thickness, can a cube have a real existence.'</para>
            </body>
        </chapter>
    </body>
</pbbook>
```

Fig. 2

```xml
<?xml version="1.0" encoding="UTF-8"?>
<!-- edited with XMLSPY v5 U (http://www.xmlspy.com) by Eva (Eva) -->
<xs:schema xmlns:xs="http://www.w3.org/2001/XMLSchema"
elementFormDefault="qualified" attributeFormDefault="unqualified">
    <xs:element name="format">
        <xs:annotation>
            <xs:documentation>Comment describing your root element</xs:documentation>
        </xs:annotation>
        <xs:complexType>
            <xs:sequence>
                <xs:element name="book-name"/>
                <xs:element name="page-size"/>
                <xs:element name="margins">
                    <xs:complexType>
                        <xs:sequence>
                            <xs:element name="top"/>
                            <xs:element name="bottom"/>
                            <xs:element name="left"/>
                            <xs:element name="right"/>
                        </xs:sequence>
                    </xs:complexType>
                </xs:element>
                <xs:element name="font">
                    <xs:complexType>
                        <xs:sequence>
                            <xs:element name="family"/>
                            <xs:element name="size"/>
                        </xs:sequence>
                    </xs:complexType>
                </xs:element>
                <xs:element name="spacing">
                    <xs:complexType>
                        <xs:sequence>
                            <xs:element name="character" minOccurs="0"/>
                            <xs:element name="word" minOccurs="0"/>
                            <xs:element name="leading"/>
                        </xs:sequence>
                    </xs:complexType>
                </xs:element>
            </xs:sequence>
        </xs:complexType>
    </xs:element>
</xs:schema>
```

Fig 3

```xml
<?xml version="1.0" encoding="UTF-8"?>
<xsl:stylesheet version="1.0" xmlns:xsl="http://www.w3.org/1999/XSL/Transform"
xmlns:fo="http://www.w3.org/1999/XSL/Format">
    <xsl:output method="xml"/>
    <xsl:template/>
    <xsl:template match="/">
        <fo:root xmlns:fo="http://www.w3.org/1999/XSL/Format">
            <fo:layout-master-set>
                <fo:simple-page-master master-name="simple"
                    page-height="175mm" page-width="105mm" margin-left="10mm"
                    margin-right="10mm">
                    <fo:region-body margin-top="6mm"
                        margin-bottom="12mm"/>
                </fo:simple-page-master>
            </fo:layout-master-set>
            <fo:page-sequence master-reference="simple">
                <fo:flow flow-name="xsl-region-body">
                    <xsl:apply-templates/>
                </fo:flow>
            </fo:page-sequence>
        </fo:root>
    </xsl:template>
    <xsl:template match="para">
        <fo:block padding-before="10pt" font-size="8pt"
            font="times-roman" orphans="5">
            <xsl:apply-templates/>
        </fo:block>
    </xsl:template>
    <xsl:template match="chap_title">
        <fo:block text-align="center" font-weight="bold" space-after="6pt"
            font-size="10pt">
            <xsl:apply-templates/>
        </fo:block>
    </xsl:template>
    <xsl:template match="title">
        <fo:block text-align="center" space-after="6pt" font-weight="bold"
            font-size="10pt">
            <xsl:apply-templates/>
        </fo:block>
    </xsl:template>
    <xsl:template match="author">
        <fo:block text-align="center" space-after="6pt" font-weight="bold"
            font-size="10pt">
            <xsl:apply-templates/>
        </fo:block>
    </xsl:template>
    <xsl:template match="chapter">
        <fo:block break-after="page">
            <xsl:apply-templates/>
        </fo:block>
    </xsl:template>
</xsl:stylesheet>
```

Fig 4

```
<?xml version="1.0" encoding="UTF-8"?><fo:root xmlns:fo="http://www.w3.org/1999/XSL/Format"><fo:layout-master-set><fo:simple-page-master master-name="simple" page-height="175mm" page-width="105mm" margin-left="10mm" margin-right="10mm"><fo:region-body margin-top="6mm" margin-bottom="12mm"/></fo:simple-page-master></fo:layout-master-set><fo:page-sequence master-reference="simple"><fo:flow flow-name="xsl-region-body"><fo:block text-align="center" space-after="6pt" font-weight="bold" font-size="10pt">The Time Machine</fo:block><fo:block text-align="center" space-after="6pt" font-weight="bold" font-size="10pt">H G Wells</fo:block><fo:block break-after="page"><fo:block text-align="center" font-weight="bold" space-after="6pt" font-size="10pt">I</fo:block><fo:block padding-before="10pt" font-size="8pt" font="times-roman" orphans="5">The Time Traveller (for so it will be convenient to speak of him) was expounding a recondite matter to us. His grey eyes shone and twinkled, and his usually pale face was flushed and animated. The fire burned brightly, and the soft radiance of the incandescent lights in the lilies of silver caught the bubbles that flashed and passed in our glasses. Our chairs, being his patents, embraced and caressed us rather than submitted to be sat upon, and there was that luxurious after-dinner atmosphere when thought roams gracefully free of the trammels of precision. And he put it to us in this way--marking the points with a lean forefinger--as we sat and lazily admired his earnestness over this new paradox (as we thought it) and his fecundity.</fo:block><fo:block padding-before="10pt" font-size="8pt" font="times-roman" orphans="5">'You must follow me carefully. I shall have to controvert one or two ideas that are almost universally accepted. The geometry, for instance, they taught you at school is founded on a misconception.'</fo:block><fo:block padding-before="10pt" font-size="8pt" font="times-roman" orphans="5">'Is not that rather a large thing to expect us to begin upon?' said Filby, an argumentative person with red hair.</fo:block><fo:block padding-before="10pt" font-size="8pt" font="times-roman" orphans="5">'I do not mean to ask you to accept anything without reasonable ground for it. You will soon admit as much as I need from you. You know of course that a mathematical line, a line of thickness NIL, has no real existence. They taught you that? Neither has a mathematical plane. These things are mere abstractions.'</fo:block><fo:block padding-before="10pt" font-size="8pt" font="times-roman" orphans="5">'That is all right,' said the Psychologist.</fo:block><fo:block padding-before="10pt" font-size="8pt" font="times-roman" orphans="5">'Nor, having only length, breadth, and thickness, can a cube have a real existence.'</fo:block></fo:block></fo:flow></fo:page-sequence></fo:root>
```

Fig. 5

The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog. The quick brown fox jumped over the lazy dog.

Fig 7

The quick brown fox jumps over
the lazy dog. The quick brown fox
jumps over the lazy dog. The quick
brown fox jumps over the lazy dog.
The quick brown fox jumps over
the lazy dog. The quick brown fox
jumps over the lazy dog. The quick
brown fox jumps over the lazy dog.
The quick brown fox jumps over
the lazy dog. The quick brown fox
jumps over the lazy dog. The quick
brown fox jumps over the lazy dog .
The quick brown fox jumps over
the lazy dog. The quick brown fox
jumps over the lazy dog. The quick
brown fox jumps over the lazy dog.

Fig 8

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 9

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 10

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 11

The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.

Fig 12

The quick brown fox

Fig 13

The quick brown fox

Fig 14

The QUICK brown FOX jumps OVER the LAZY dog.

The quick brown fox jumps over the lazy dog.

The *quick* brown *fox* jumps *over* the *lazy* dog.

The quick brown fox jumps over the lazy dog.

The quick brown fox jumps over the lazy dog.

Fig 15

The *quick* BROWN fox *jumps* OVER the *lazy* DOG.

The quick brown fox jumps over the last dog.

Fig 16

The quick brown fox jumped over the lazy dog. The quick brown fox jumped
*over the lazy dog. The quick brown fox jumped over the lazy dog. The quick brown*
fox jumped over the lazy dog. The quick brown fox jumped over the lazy dog.

Fig 17

The quick brown fox jumps over the lazy dog.

Fig 18

The quick brown fox jumps over the lazy dog.

Fig 19

Hardy sees parallels with the general theory of relativity, Einstein's theory of gravity.

"The mathematical framework of the theory-the geometry of curved space-was actually discovered ahead of time by Bernhard Riemann and others in the mid-19th century", he says. " It's only bad luck that the same thing did not happen for quantum theory".

So what would it have taken for quantum theory to be discovered in the Victorian era?

Hardy highlights the crucial difference between classical probability theory and quantum theory. Imagine two boxes and a ball; if the ball is in one box it represents the binary digit "1", in the other it represents "0". "In classical probability theory these are the only options," says Hardy. "But in quantum theory, the ball can be in both boxes at the same time-there is a continuum of states between 0 and 1".

Fig. 20

Hardy sees parallels with the general theory of relativity, Einstein's theory of gravity.

"The mathematical framework of the theory-the geometry of curved space-was actually discovered ahead of time by Bernhard Riemann and others in the mid-19th century", he says. " It's only bad luck that the same thing did not happen for quantum theory".

So what would it have taken for quantum theory to be discovered in the Victorian era?

Hardy highlights the crucial difference between classical probability theory and quantum theory. Imagine two boxes and a ball; if the ball is in one box it represents the binary digit "1", in the other it represents "0". "In classical probability theory these are the only options," says Hardy. "But in quantum theory, the ball can be in both boxes at the same time-there is a continuum of states between 0 and 1".

Fig. 21

Fig. 22

▶               ◀
The quick brown fox jumps over the lazy dog.

■
The quick brown fox jumps over the lazy dog.
   ■

Fig. 23

The quick brown fox jumps over the lazy dog.
1   2   3   4   5   6   7   8   9

Fig. 24

The quick brown fox jumps over the lazy dog.
•   ••   •••   •   ••   •••   •   ••   •••

Fig. 26a am-big-u-ous

Fig. 26b

The quick brown fox jumps over the lazy dog.
♠   ♣   ♥   ♦   ♠   ♣   ♥   ♦   ♠

Fig. 27

The quick brown fox jumps over the lazy dog.
◄           ►

Fig. 28

This is
a new
way of
reading
that
allows
someone
to read
vertically
to save
the
need for
horizontal
eye
tracking.

Fig. 29a

This is
a new
way of
reading
that
allows
someone
to read
vertically
to save
the
need for
horizontal
eye
tracking.

Fig. 29b

When in the course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

When in the course
   of human events,
     it becomes necessary
       for one people
         to dissolve
            the political bands
       which
         have connected them
            with another,
   and to assume
     among the powers
       of the earth,
   the separate
     and equal station
   to which
      the Laws of Nature
         and of Nature's God
         entitle them,
   a decent respect
     to the opinions
       of mankind
     requires that
       they should declare
         the causes
           which impel them
              to the separation.

Fig. 30

REFORMATTING TEXT IN A DOCUMENT FOR THE PURPOSE OF IMPROVING READABILITY

RELATED APPLICATIONS

This application is a continuation-in-part of and claims the benefit under 35 U.S.C. §120 from U.S. patent application Ser. No. 10/551,118, now U.S. Pat. No. 8,719,696, which is a national phase entry of International Application No. PCT/AU2004/000341, filed Mar. 22, 2004, which claims the priority of Australian Patent Application No. 2003901428, filed Mar. 24, 2003, all of which are incorporated herein by reference.

TECHNICAL FIELD

The field of this application relates to the production of documents and to the distribution of reading material.

BACKGROUND

Commercial computer networks, such as the Internet, have been used as a means of facilitating ordering of books and other reading material by consumers. This is typically achieved by presenting a web site-based user interface to consumers to allow them to order reading material such as books. One example of this is the website Amazon.com. However, the reading material that can be purchased by users of these systems are the same as the offering made by a traditional book store. That is, each item of reading material is usually offered in only one format. Further, users must wait whilst the reading material they ordered is retrieved from a warehouse and shipped to them.

The distribution of electronic documents is generally known and is described, for example, in International Publication No. WO 00/72235 A1 (Silverbrook Research Pty Ltd, 30 Nov. 2000). Silverbrook describes text being formatted in the Extendable Mark-up Language (XML) using the Extensible Stylesheet Language (XSL). However, Silverbrook enables only a single user choice for formatting, namely larger presentation.

SUMMARY

Disclosed herein is a system for producing and distributing a document comprising: a server site including a repository for storing documents in a marked-up form according to one or more mark-up schemas adapted to make explicit the structural information contained in a document, a document format store for storing formats, and a document production processor for generating a user-requested document from the marked-up form using a user-selected format, the generated document retaining the implicit structural information; a network to which the server site is in communication; and a printing site to which the user-requested document is sent via the network to be printed; wherein the document production processor is adapted to take into account printing capabilities of the printing site in generating the user-requested document, such that the printing site is capable of printing the generated document.

Further disclosed herein is a method for producing and distributing documents comprising the steps of: marking-up documents according to a schema that makes explicit the structural information contained in the document; receiving a customer order for a document over an electronic network, the order including formatting information and a printing site at which the document is to be printed; applying a customer-selected format containing the formatting information to the marked-up document to generate a customer-requested formatted document in electronic form using the format, the generated document retaining the implicit structural information; and transmitting the electronic document over the network to the printing site, wherein the applying takes into account printing capabilities of the printing site such that the printing site is capable of printing the generated document.

Further disclosed herein is a method of supplying a book to a library, the method comprising: receiving a request for the book over an electronic network, the request including formatting information and information specific to the library; applying the formatting information and the library-specific information of the request to a marked-up document representing the book to generate a printer-ready form of the book, and transmitting the printer-ready form over the electronic network.

Further disclosed herein is a system for producing and distributing a document comprising: a server site including a repository for storing documents in a marked-up form according to one or more mark-up schemas adapted to make explicit the structural information contained in a document; a document format store for storing formats, and a document production processor for generating a user-requested document from the marked-up form using a user-selected format, the generated document retaining the implicit structural information, wherein the user-selected format is a special format adapted to aid discrimination of characters in words or provide additional information to aid processing the words and characters in the right order.

Additional aspects and advantages will be apparent from the following detailed description of preferred embodiments, which proceeds with reference to the accompanying drawings.

BRIEF DESCRIPTION OF THE DRAWINGS

In the drawings:

FIG. 2 is an example of a document marked up to an XML schema and stored in the system of FIG. 1a;

FIG. 3 is an example of an XML document used to define a format in the system of FIG. 1a;

FIG. 4 is an example of an XSL style sheet used in the system of FIG. 1a;

FIG. 5 is an example of an XSL:FO document used in the system of FIG. 1a;

FIG. 6 is an example of a PDF document output by the system of FIG. 1a;

FIG. 7 is an example of a passage of text;

FIGS. 8 to 12 depict the text of FIG. 7 with further alternative formats applied;

FIGS. 13-25, 26a, 26b, 27, 28, 29a, 29b, and 30 illustrate examples of text with formats applied;

FIG. 31 contains a flow chart of a method carried out by the server site of FIG. 1a.

DEFINITIONS

In this specification the following words have the following meanings:

Document—is intended to mean any reading material in hard copy or electronic form and includes books, pamphlets, brochures, reports, bank statements and other written material.

Format—is used to describe the general physical appearance of written material, including such things as type face, type size and margins.

DETAILED DESCRIPTION OF PREFERRED EMBODIMENTS

Figure 1A:
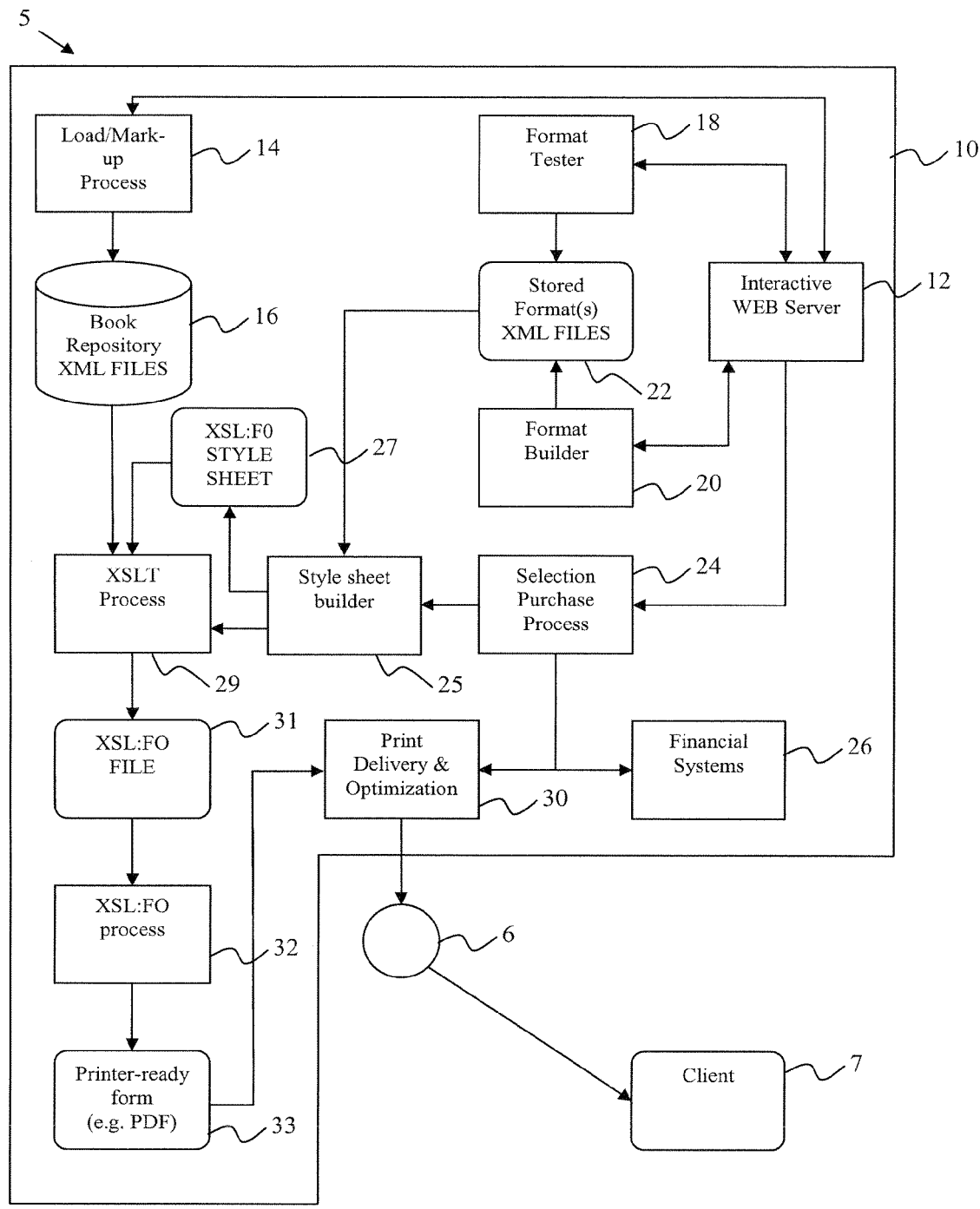
FIG. 1a is a schematic view of a system for distributing reading material according to an embodiment.

Referring to FIG. 1a, a system 5 for distributing reading material is shown in schematic form. The system 5 includes a network 6, a client site 7 and a server site 10. The server site 10 is represented schematically as a collection of software functions running on a suitably configured computing system which is connected to the network 6, typically the Internet.

The server site 10 includes an interactive web server 12 which is presented to users (i.e. clients), and allows users to request documents in a desired format.

A load/markup process 14 allows the upload and mark-up of documents to conform with a pre-defined set of rules, that preferably is a XML schema. The schema is constructed in such a manner as to facilitate automated publishing. Thus an advantage of the schemas as described is that textual structural information is retained such that a coherent copy can be produced. For example, the line breaks in a poem are vital to its integrity as a document. The application of a schema makes the structural information implicit in a document become 'explicit'. There is a schema for each 'class' of document. A non-exhaustive list of classes includes: novel, technical text, engineering text, history text, and so on.

Each schema specifies 'major' structural information/elements of a document, which are elements that do not contain text directly. For a novel this typically can include: Book, Front matter, TOC, Preface, Introduction, Body, Chapter, Section, Sub-section, End matter, Index, and so on. Each schema further specifies 'minor' structural information/elements that contain text and, for example, emphasis. This typically includes: Para, Number para, and Special para. The purpose of the 'Special para' element is to avoid the need for excessive elements. A specific example of a 'Special para' is a poem, made up of a series of 'lines' (including blank lines), with attributes to handle justification and presentation. In other words, in most schemas, a 'line' is the highest level of precision contemplated in the mark-up schema, apart from words and characters selected for special formatting (see below).

All 'minor' structural elements are required to flow into the rendition, and in that sense the flow is an immutable rule that cannot be affected by the user formatting. The granularity of 'minor' structural elements can be as fine as individual words or characters, which would allow control over formatting down to the word or character level (as will be discussed below).

An example of a document marked-up to such a schema is shown in FIG. 2. In this example, a 'minor' structural element is each of the paragraph tags <para number=" "> enclosing text. Documents are marked-up to this schema either by users or by the server site 10, and stored in a repository 16 after being validated (e.g. parsed). The repository could take many forms, including LAN-connected computers or multiple database servers connected over the Internet.

When a user orders a document for production, in addition to identifying the document, the user must specify or choose the format in which the document is to be produced. The web server 12 which allows a user to choose from a range of existing formats (i.e. stored formats 22). Alternatively, the user can prepare and select their own format using format builder 20, or take an existing format and change it. Formats are stored as XML documents (or in a database) where each format parameter (such as font type, font size etc) has an XML tag and attributes (or named value pair) that allow a style sheet builder 25 to recreate a style sheet that will generate the formatted document. An example of an XML document used to define a format shown in FIG. 3. Formats are discussed in greater detail below.

The XML documents embody a set of rules that encompass what is needed to process a document to completion. The rules have replaceable parameters that can be chosen or modified by the user.

The format builder 20 therefore allows the user to specify desired format parameters based on personal requirements. The user can specify one or more of the following format parameters:

page size
margins
fonts (including special fonts and word shaping)
leading (including line shaping and making special effects in spaces between lines)
effects
colors
spacing
shading
justification The rules operate to transform the information made explicit in the stored marked-up documents back to implicit information embodied in the output document.

The format tester module 18 is an optional module that helps a user select the best format for that person as an individual. The format tester 18 operates on rules that are based on knowledge of reading disabilities and formats that assist those reading disabilities.

The selection purchase process 24 allows a user to select a document they wish to be produced from those stored in the repository 16. The web server 12 enables a user to make a selection from one of a plurality of stored formats or to create their own format.

Figure 6:
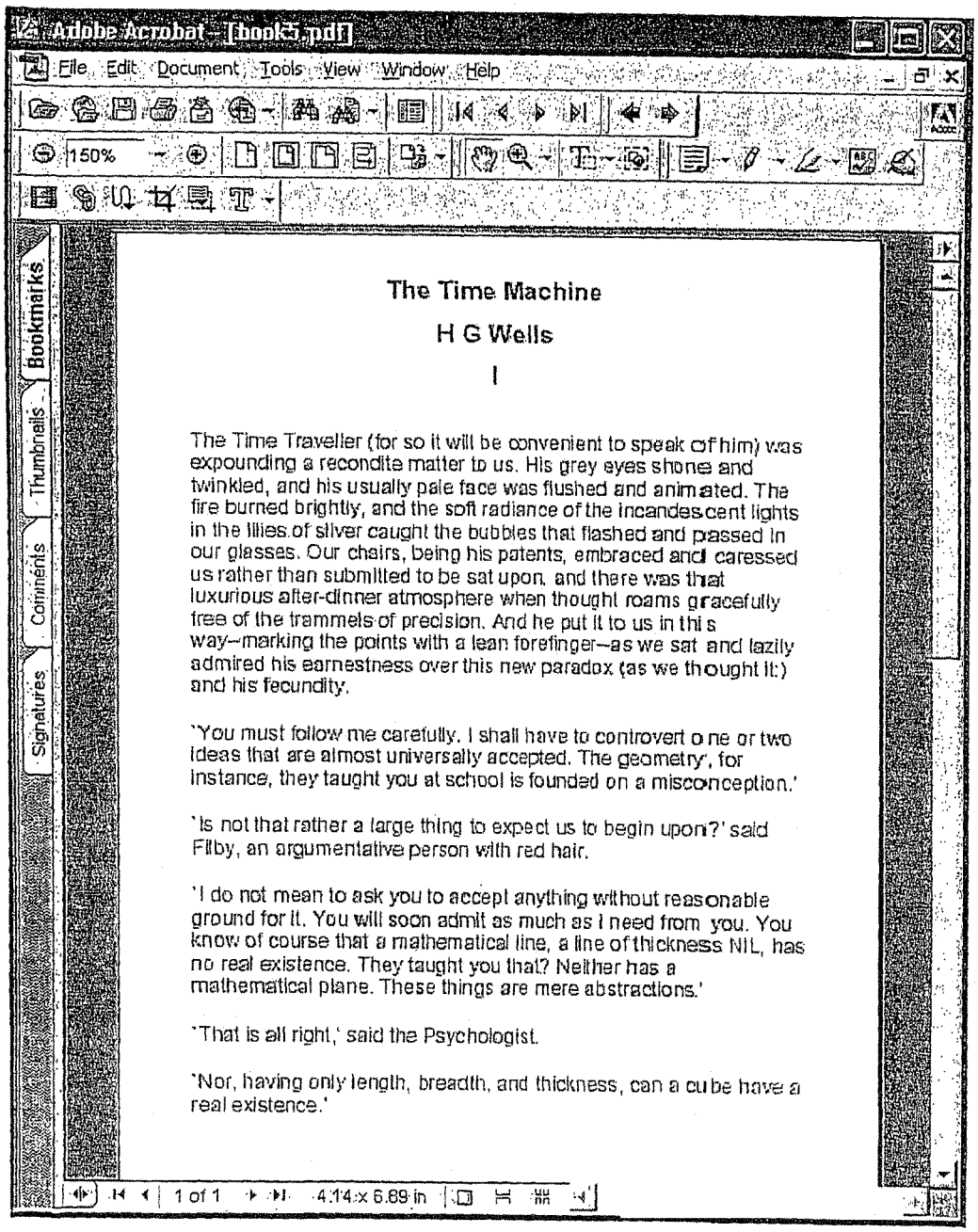

After the user has selected their required format, and the document they wish to be produced, the document is produced in the selected format by operation of the style sheet builder 25, an XSLT processor 29 and an XSL:FO processor 32. The Style Sheet Builder 25 uses the XML file defining the format selected by the user to create an XSL:FO style sheet 27, for example as shown in FIG. 4. This style sheet is then applied by the XSLT processor 29 to the XML document which corresponds to the document selected by the user from the repository 16 to produce an XSL:FO file 31, for example as shown in FIG. 5. The explicit flow information in the XML document captured in the mark-up cannot be modified by this process. When in final form, the XSL:FO file 31 is processed by the XSL:FO processor 32 to produce the document in a form ready for printing (printer-ready form) 33, in this case in PDF format, as shown in FIG. 6.

The server site 10 includes a print and delivery optimization system 30 which arranges delivery of the produced document to the user based on order information provided by the user. The order information is a combination of known facts about the user which are associated with their user ID such as their default delivery address and preferred payment method, in combination with any special requirements they have included in the particular order they are making. The order information also includes details of the selection of desired document and format that the user made above.

The delivery and optimization system 30 may deliver the printer-ready form 33 to a user by sending it to their e-mail address.

The delivery system may have built-in file compression. The client site 7 may not embody the ultimate user/purchaser, rather can be a printery at a physical location close to the reader which prints, binds and dispatches a hard copy document to the user. The printery can be selected for proximity, for lowest printing cost, for lowest printing and delivery cost, or for speed of delivery depending upon the requirements of the user.

The production cost of the produced document is determined in part by the format previously selected by the user. For instance, users with good eyesight can have books printed out in a small font and thereby require less paper. This lowers the production cost. Users requiring a large font will need more pages printed so the produced document will cost more. The printing cost is also determined in part by the location of the printery. For instance, printing at a location near to the user will minimize the transport costs in transporting the printed document to the user's delivery address. The printing cost is also determined in part by the country in which printing is carried out. For instance, printing in Mexico is much cheaper than the United States.

Different makes and models of printers have different formatting capabilities. For example: some printers have the capacity to print double-sided (duplex) whereas some do not; some printers require different paper from other printers—for example, some printers cannot print thin paper and some cannot print thick paper; some printers use different inks that bleed through thin paper; printers have different printable areas on a page, different minimum and maximum font sizes, different color capabilities, different capacities to print images (some printers can print images with higher resolution and more shades of grey or color than other printers), etc.

If a book is being produced, then a cover must be produced and the pages of the book attached to the cover—i.e. the book must be bound. The cover has a front and back page and a spine (unless it is being ring bound or bound in a similar process to ring binding). The width of the spine will depend on a number of factors including the number of pages, the thickness of the pages and the pressure of the clamp in the binder that holds the text of the book when the cover is being attached.

Usually a book is designed to be printed and bound on specific equipment and using specific paper to ensure that the cover (especially the spine of the cover) will fit the text of the book. This can require that a company wanting to offer printing in multiple places uses exactly the same equipment and paper in all the different locations where they want to print books.

Being able to print documents and/or bound books on a variety of different printers and/or binders will allow documents and books to be printed on existing printers and/or binders in many places whilst still producing high quality books.

The capabilities of the printer and/or binder on which the printer-ready form 33 of the document is to be printed (the target printer) impose certain requirements on the printer-ready form 33 that is generated by the XSL:FO processor 32. The print delivery and optimization system 30 passes information about the capabilities of the target printer to the XSL:FO processor 32 so that the XSL:FO processor 32 produces the printer-ready form 33 in a format that meets the requirements of the target printer. In addition, certain parameters of the printer-ready form 33 may be optimized for the target printer by the XSL:FO processor 32 so that the final appearance of the printed document is as good as possible when printed on the target printer.

The financial systems module 26 collects any payments required from users as a result of use of the system 5.

One channel of particular importance in the dissemination of printed material is libraries. Because of the more frequent handling of library books than is usual for books purchased for private use, library books are usually either ordered with especially robust covers or covered with protective material after acquisition. In addition, library-specific information such as library name, catalogue number (usually in a bar code form) (in many libraries, each book is given a different number), classification information (e.g. a Dewey decimal number), date of acquisition, and other information, such as additional shelving information, need to be added to the book before shelving. This amounts to considerable expense in labor and materials over and above the normal cost of the book. Libraries are always constrained by acquisition budgets and can rarely afford to obtain multiple copies of a book in different formats, which affects access to library content for a significant number of readers.

Figure 1B:
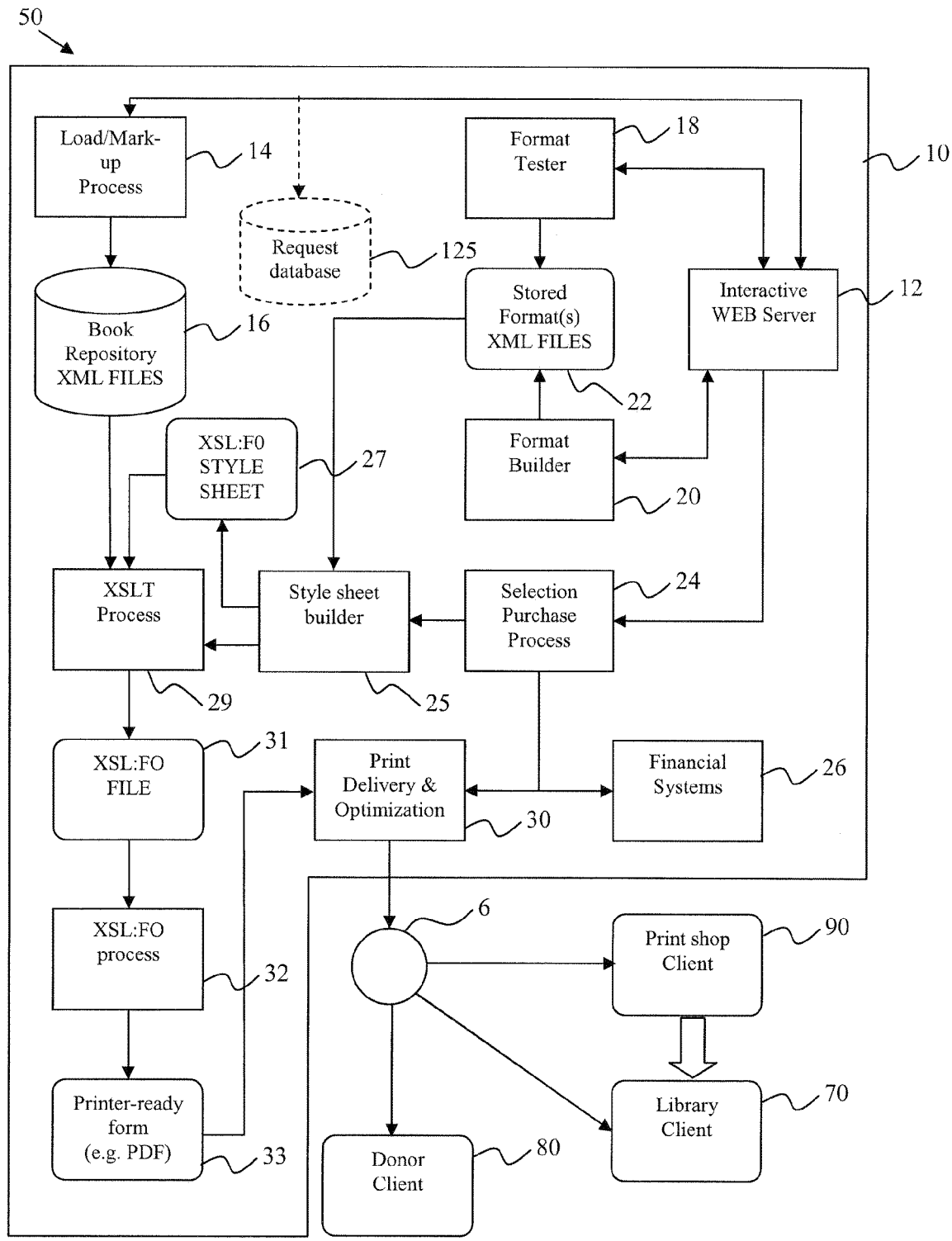
FIG. 1b is a schematic view of a system for supplying a book to a library according to a further embodiment.

Referring to FIG. 1*b*, a system 50 for supplying books to a library is shown in schematic form. The components of the system 50 are the same as those in the system 5 of FIG. 1*a*, as indicated by the corresponding labels, except as described below. A library client 70 using the system 50 can order a book in a format suitable for the expected readership of the book. The server site 10, on receiving a request from a library client 70, supplements the selected format with the insertion, on the cover or on an early page, of the library-specific information mentioned above, which is supplied by the library client 70 as part of the request. The printer-ready form 33 therefore includes the library-specific information, so the final printed product is ready for shelving on delivery without the extra expense mentioned above.

Figure 31:
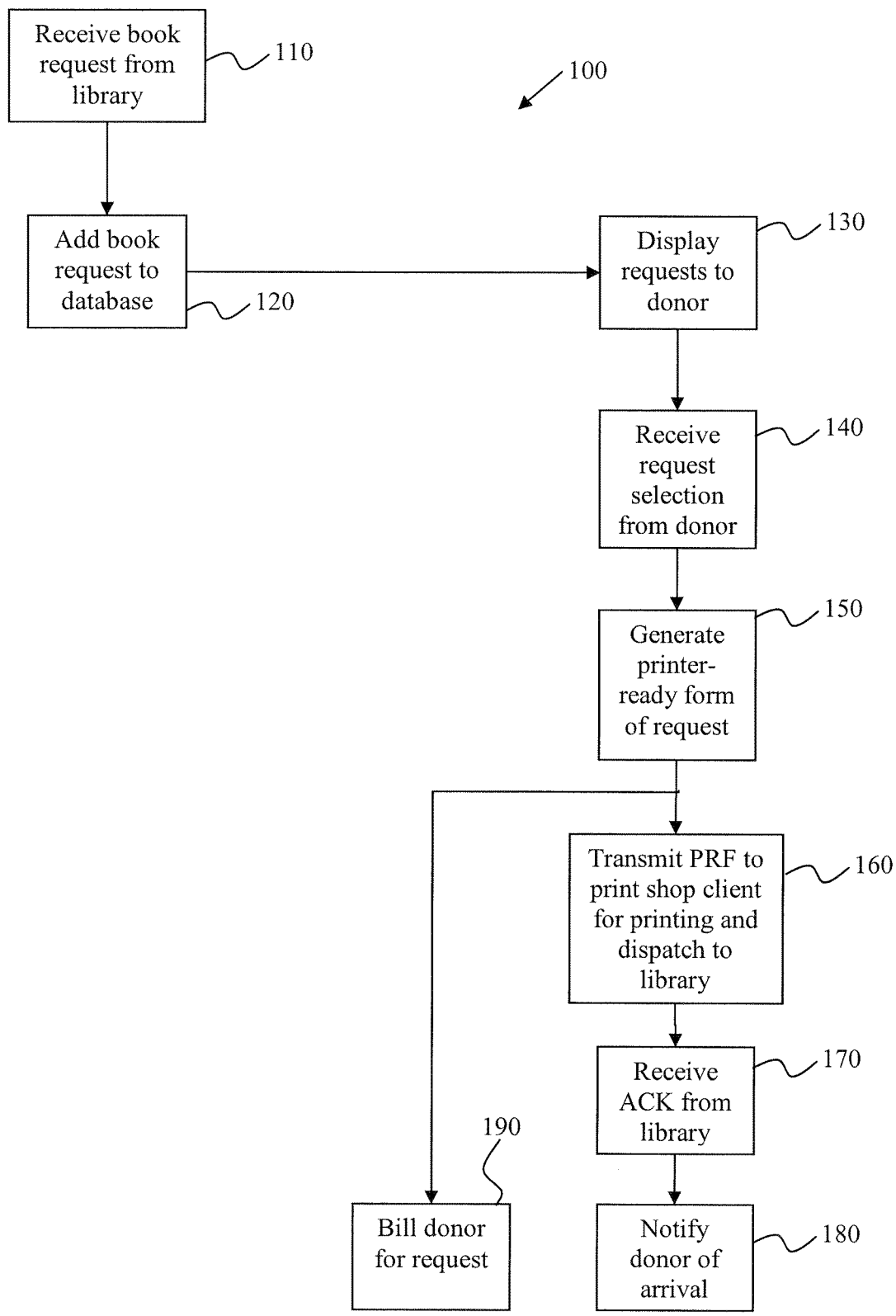

To further reduce the cost of book acquisition for libraries, the system 50 may be supplemented to allow the involvement of a book donor. FIG. 31 contains a flow chart of a method 100 carried out by the server site 10 of the system 50. On receiving (110) a request from a library client 70, the server site 10, rather than fulfilling the request immediately and charging the library, adds (120) the request to a database (125 in FIG. 1*b*) of library requests for books. Each request comprises a book identifier, a required format for the book, the library-specific information mentioned above, and a cost amount. The requests in the database are displayed (130) to potential donors via the web server 12. The donor views the library requests in the database 125 via a donor client 80 connected to the network 6, and selects a request via the web server 12. On receipt (140) of a selected request from the donor client 80, the server site 10 fulfils the request by generating (150) the printer-ready form 33, including the library-specific information, of the requested book in the requested format as described above. The server site 10 then transmits (160) the printer-ready form 33 to a client 90 of a print shop that can print and bind the book according to the specification of the library, and package and ship the book to the library at no cost to the library. As an alternative, at step 160 the server site could transmit the printer-ready form 33 directly to the library client 70 to be printed there. The server site 10 also bills (190) the donor via the client 80. The library-specific information to be printed with the book may be supplemented to include a dedication acknowledging the role of the donor in donating the book to the library. A further incentive for potential donors is that the server site 10 provides the donor with the opportunity to be the first to read the book, for example by sending (180) an email to the donor client 80, once the server site 10 receives (170) an acknowledgement from the library client 70 of the book's readiness at the library.

Reader Defined Variable Format Patterns

As described above, the system 5 allows a user to define variable patterns within the format of a book or other document, and apply these format rules automatically to the whole document. Creating a book where every page is visually different is an aid to visual memory. The variable format patterns of the book include:

- Random patterns—for example, every page is formatted with different margins or paragraph margins which are determined by random numbers.
- Content based patterns—for example, every mathematical formula is printed in a particular way.
- Regular patterns—for example every page has a different watermark on it.
- A combination of the above.

The variable format patterns include variations in the following parameters:
- paragraph shapes
- paragraph line spacing within and between paragraphs
- underlining with variable thickness and color
- creation of patterns of words in paragraphs to make a paragraph visually memorable, using fonts, colors, type sizes (one pattern in one paragraph and another in another paragraph)
- creation of patterns within paragraphs using the same technique (i.e. one paragraph is in one format, the next paragraph is in another format etc)
- watermarks
- page margin sizes
- placement of distinctive and possibly unrelated illustrations on a page Using the system 5, a user could therefore obtain a textbook in two volumes—one for the text and the other for the diagrams, tables, footnotes, indices etc. Or the user could define large margins so that they could write notes in these margins. Further, a user could apply random page formats. Yet further, a user could insert blank pages at appropriate locations.

These formats can be applied to produce documents intended for electronic use or printing in hard copy documents and is not limited to the production of books.

Also, using the system 5, a user could select what major structural elements of a selected document are to be included in or excluded from the final delivered document. For example, a user could select a series of short stories, technical papers, manuals, lectures or lessons, travel guides, recipes and the like that are of interest from a collection. If these documents were independently indexed, the reader selected collection would contain a new index incorporating the indexes of all the selected papers. Footnotes on the selected papers would appear as footnotes or endnotes in the new edition, and a table of contents for the new edition would be created for that edition. A reader dedication could also be included.

Alternatively, the reader could exclude part of a book that did not interest the reader. Only those index, footnote and table of contents entries relevant to the non excluded part would be in the new edition.

Information from different publishers may be initially published in differing formats by the publishers. The information for different publishers is marked up by the process 14 into a consistent XML format, so (subject to copyright permissions) readers can select the information they want for a new publication from different publishers, and the new edition will have a consistent structure, format, footnotes, index and table of contents.

Special Formats

Some people have trouble comprehending reading material. This can be for a number of reasons including problems with vision, eye control, discrimination of individual images, recognition and conceptualization of images into meaningful words, and processing of meaningful word concepts into meaningful sentences.

Problems with vision may include lens problems involving focus such as astigmatism, long-sightedness, short sightedness and other lens problems, retinal problems such as inability to read in normal light conditions, color contrast issues, blind spots, and nerve problems connecting the eye to the brain. A condition known as "macular degeneration" affects the foveal, or central, vision of the eye while leaving the peripheral vision relatively unaffected.

Problems with eye control include the inability of the eye to follow words sequentially in a line of text in the correct direction.

Problems with recognition and conceptualization of meaningful words include the inability to differentiate between the image of a character and the mirror image of the character (e.g. "b" and "d") or the same character after rotation (e.g. "d" and "p"). They also include transposition of characters in a word, reading the whole or part of a word backwards as is common in dyslexia, and reading words in a different order to the order in which they are written. Another kind of problem is that people may not know what specific words mean.

Special formats are formats specifically designed to help people better discriminate characters they have difficulty in discriminating, or to provide additional information in the form of visual patterns that will assist readers mentally to process the words and characters in the right order.

The formats that are applied to the document may cause it to be changed with respect to character height, character width, font color, background color, character density, margin sizes, character aspect ratio, character shading, line length, line spacing, and separators between lines of text. A combination of the above may be used.

There are several different kinds of formats which can be applied. One kind of formats aid discrimination between the characters or symbols presented to users. An example is to make the character "b" and the character "d" look so different that the reader can distinguish them. Another example is to format the text in a size, color and font so that a person with visual impairment can read it.

Another kind of formats involve the creation of a pattern in the characters and words to give additional information to the reader so that the reader can better interpret the order of the characters and words and thus get a sense of the direction in which to read, or have their attention drawn to the particular part of the word they may have difficulty with. In one example, some readers seem to disregard the end of the word, and drawing attention to the end of the word by increasing the size or bolding the characters or otherwise "highlighting" the end of the word may assist these readers to consider the whole word. Another example is to format text with words in alternating colors, or in a "shape" so that certain words start in a small font and finish in a larger font, or vice versa. A reader can then be instructed to read in the direction of increasing character size.

Every word can be formatted in this way or just certain words that the reader has difficulty with. These could be classes of words such as non-phonetic words, multi-syllable words, and words that an individual reader finds difficult, to which special formatting is applied. Readers whose native language is a language other than English are likely to have problems with specific words that may be specific to the language of origin of the reader. The words may be selected by searching for each word in a pre-generated list comprising the classes of words to be formatted.

Yet another example of a format is to parse certain words into syllables and format the syllables in different colors or fonts, or separated by a separator character, or glyph, such as a hyphen. A "shape" may be applied to each parsed word so that, for example, each syllable is formatted in a larger font than its predecessor. The syllable to be stressed in reading the parsed word may be "highlighted" relative to the other syllables, for example by using bold characters, as follows: "em-pha-sis", or formatting in a different font, color, or size.

Yet another example of a format is to highlight prefixes and/or suffixes of words such as "re-", "pre-", "-ness" or "-ation". This is done by analyzing certain words against a pre-generated table of prefixes and suffixes to identify the prefix and/or suffix. Alternatively, the "root" portion of the word, that is the portion less any prefixes and/or suffixes, may be highlighted.

Yet another example of a format is to add color to words of a particular grammatical type, such as formatting a noun in red and a verb in blue. Along similar lines, words that are non-phonetic in pronunciation, such as "fatigue", may be highlighted by a color change or a bold font. The non-phonetic part of compound words formed by adding prefixes and suffixes to non-phonetic words may also be highlighted. For example, the word "head" is non-phonetic—it is pronounced as "hed" not as "heed". The whole word "beheading" could be highlighted, or displayed as "beheading" with the non-phonetic part of the word highlighted.

Another kind of special formatting treats syntactic phrases in the same manner as words, and words in the same manner as syllables, in the formatting described above, in order to assist readers who have difficulty in parsing text into syntactic phrases for themselves. For example, each phrase may be formatted in different colors, sizes, or fonts, or on different lines. Or, a "shape" may be applied to each syntactic phrase so that, for example, each word in a phrase is formatted in a larger font than its predecessor. Alternatively, the most important word in each phrase may be "highlighted" relative to the other words. As a further alternative, phrases with different syntactic functions, for example noun phrases, adjectival phrases, etc., could be formatted according to their respective syntactic functions. Or, the most syntactically important phrase in a passage could be highlighted.

Another kind of format involves adding additional information into the text, such as words in another language or pictograms. Another kind of additional information is "quasi-phonetic" renderings of non-phonetic words, identified using a list as described above. An example of a quasi-phonetic rendering is "fat-teeg" for the non-phonetic word "fatigue". The quasi-phonetic rendering may be added "in-line", that is, in brackets before or after the non-phonetic word (for example "fatigue [fat-teeg]"), or above or below the non-phonetic word in the text, possibly in a different font. Such insertions are useful for the beginner, but a more advanced reader may find the flow of text is interrupted by such insertions. Therefore, an alternative is to add the quasi-phonetic rendering as a footnote to the non-phonetic word. A still further alternative, suitable for electronic documents, is to "hyperlink" the non-phonetic word to an audio recording of the non-phonetic word being pronounced.

Formats may also affect the spacing between lines. Lines of various thickness and shape can be inserted between lines of text to help readers order characters within words, words within lines, and lines within paragraphs.

Formats may also affect the length of lines. Normal readers use their central vision to locate the beginning and end of words and where the next word begins. People with macular degeneration cannot use their central vision in this way as it is lost. So they need to be able track their eyes using their peripheral vision, as well as using their peripheral vision to read text. Some people with macular degeneration find it difficult to track a horizontal line of text using peripheral vision. Short lines of text containing a few words at most are easier to track using peripheral vision and are therefore more suitable for reading by people with macular degeneration. Ideally the length of the line of text is designed to fit an individual reader's maximum window of vision in his or her peripheral vision so that the reader can see the whole line and the horizontal eye movement is minimized. One or more vertical lines may be added on either side of the resultant narrow columns of text to assist the reader in tracking the vertical direction of the text. The columns can be numbered so that readers can navigate more precisely and not skip columns.

A refinement of this kind of special formatting for macular degeneration is to parse a section of text into short syntactic phrases, and format each phrase on a separate line. This is easier for some readers than breaking a line in the middle of a phrase, provided that there is enough space. An additional refinement is to vary the indentation of each syntactic phrase according to its syntactic significance.

The person may read the formatted document when it is in either hard copy or electronic form. With electronic materials, the format can be dynamic. An example is highlighting of words in a particular order for a particular time so that the reader's eye is taken along the line of the text in the right order, and without the eye jumping to the next line.

Yet another example of a special format is modified Braille. Braille characters consist of two columns, each column comprising from zero to three raised dots, in patterns designed to be efficiently read through the fingertips of visually impaired people. For those who acquire this disability later in life, Braille can be difficult to master. One particular problem with conventional Braille is that the spacing between characters makes it difficult to determine which column of dots belongs to which character. The modified Braille special format inserts wider spaces between the Braille characters to assist the reader to assign columns of dots to characters. The modified Braille may also comprise larger than usual Braille characters. Another aspect of modified Braille is the inclusion of a table of Braille characters against the Moon alphabet, which consists of embossed or raised versions of normal text characters.

An example of an optically corrected font is tall thin characters for a person whose astigmatism elongates horizontally and contracts vertically.

Other formatting rules that may be applied include changes to the alignment of the characters at the bottom of a line to align them with the middle or top of a line.

Referring to FIG. 7, an example passage of text is shown.

Referring to FIG. 8, the text of FIG. 7 is shown with increased left and right margins.

Referring to FIGS. 9, 10 and 11, the text of FIG. 7 is shown with three different paragraph shapes. These are achieved by varying line length within the paragraph and justifying the text of the paragraph either to the left or the right.

Referring to FIG. 12, the text of FIG. 7 is shown with increased line spacing.

Referring to FIG. 13 a line of text is shown formatted to give it a shape. The character height diminishes towards the middle of the line of text.

Referring to FIG. 14, a line of text is shown formatted to give it a pattern. Alternate characters along the line are formatted in bold type.

Referring to FIG. 15, a line of text is shown five times, each formatted to give a pattern. The pattern repeats in groups of two words. Every second word along the line is formatted in the same manner.

Referring to FIG. 16, a line of text is shown formatted to give a pattern. The pattern repeats in groups of three words. Every third word along is formatted in the same manner.

Referring to FIG. 17, a paragraph of text is shown formatted to give a pattern. The pattern repeats in groups of three lines of text. Every third line is formatted in the same manner.

Referring to FIG. 18 a line of text is shown formatted to give a pattern. The beginning and end character of each word are formatted differently to the remaining characters of the words.

Referring to FIG. 19 a line of text is formatted to give a pattern. The pattern repeats in groups of two letters. Alternate letters have different character heights.

Referring to FIG. 20, a paragraph of text is shown with lines of constant thickness inserted between each line of text.

Referring to FIG. 21, the paragraph of text of FIG. 20 is shown with lines of tapered thickness with the taper extending in alternating directions for each alternate line of text.

Referring to FIG. 22, three lines of text are shown each formatted to give a different pattern. Alternating groups of words are underscored with lines of varying thickness.

Referring to FIG. 23, two lines of text are shown. In each line, identifying marks are associated with the characters "b" and "d" to assist a reader to distinguish between these characters.

Referring to FIG. 24, there are two lines, one of words and the other of incrementing numbers situated under the middle of the words. These numbers can assist a reader to keep the words in sequence.

Referring to FIG. 25, there is a line of words and a line of dots below the line of words. The first word has a single dot below it, the second word has two dots below it, and the third word, three. This pattern then repeats itself. The dots allow a user to sequence the words in the right order by providing more visual information about the order of the words.

Referring to FIG. 26a, a number 123,456,789 is shown in a format where each group of three digits is separated by commas. The second digit in each group is bigger than the first and the third digit in each group is bigger than the second. This gives a user visual information about the order in which the digits occur and assists readers in keeping the digits in the right order.

Referring to FIG. 26b, the word "ambiguous" is shown parsed into syllables, where the syllables are separated by hyphens and each syllable is formatted in a larger font than its predecessor.

Referring to FIG. 27, there are two lines, one of words and one of a pattern of alternating symbols used to distinguish between suits in a pack of cards. The position of the symbol approximately in the middle of the word sets up a visual pattern that allows users to locate the words in the right order.

Referring to FIG. 28, two triangles are situated below the letter "q", pointing left, and the letter "p", pointing right, providing a reader with more visual information to help distinguish between "p" and "q".

Referring to FIG. 29a, a section of text with extremely short line length, forming a narrow column, is shown. Also shown are vertical lines on either side of the narrow column of text, to aid the eye in tracking vertically down the column.

Referring to FIG. 29b, a section of text is shown with extremely short line lengths as in FIG. 29a and with shading between the lines and between the beginning of the word and the left vertical line, and between the end of the word and the right vertical line. The shading can assist readers to see that the line has ended and not get lost looking for the line end.

Referring to FIG. 30, a section of text is shown, with each syntactic phrase formatted on a separate line indented according to the syntactic significance of the phrase.

It is to be appreciated that various alterations or additions may be made to the parts previously described without departing from the spirit or ambit of the present invention. The scope of the present invention should, therefore, be determined only by the following claims.

The invention claimed is:

1. A method of supplying a book to a library, the method comprising:

marking-up unmarked-up books according to a schema, thereby generating marked-up books, each marked-up book having explicit structural information corresponding to implicit linguistic or phonetic content of words in a corresponding one of said unmarked-up books;

storing said marked-up books in a repository:

receiving, by a server, a customization request from a library for at least one of said marked-up books over an electronic network, said request including formatting information and information specific to said library;

generating, by said server, a customer-requested formatted book in electronic form from said requested one of said marked-up books using said formatting information and said explicit structural information, the customer-requested formatted book being generated by modifying the marked-up book to add said information specific to said library and a special visual formatting corresponding to the customization request representing the implicit linguistic or phonetic content, wherein the special visual formatting includes additional visible indicators applied to the words forming cues to thereby aid reading of the book, wherein said special visual formatting is not present in the unmarked-up book corresponding to said requested one of said marked-up books, and transmitting said customer-requested formatted book over said electronic network.

2. The method of claim 1, wherein said library-specific information comprises at least one of a name of said library, a catalogue number for said book, classification information, a date of acquisition of said book, and a bar code.

3. The method of claim 1, further comprising:

displaying, over said electronic network, one or more said requests to a donor;

receiving, over said electronic network, a selection of one said request from said donor in response to said displaying, wherein said generating a customer-requested formatted book is performed based on said selected request.

4. The method of claim 3, further comprising supplementing said, library specific information with a dedication acknowledging the role of said donor in providing said book to said library.

5. The method of claim 3, further comprising, notifying, via said electronic network, said donor that said book is ready at said library.

6. The method of claim 1, wherein the additional visible indicators include a syllable break glyph positioned between syllables of a multi-syllable word.

7. A system for producing a document comprising:
a non-transitory computer-readable data storage repository storing marked-up documents, each document having been obtained by marking up an unmarked-up document according to one or more mark-up schemas, and each marked-up document comprising explicit structural reformation corresponding to implicit linguistic or phonetic content of words in said unmarked-up document;
a non-transitory computer-readable format storage medium storing a customized formatting specification;
a processor in communication with the data storage repository and the format storage medium; and
a memory operatively connected to the processor, wherein the memory stores instructions that cause the processor to generate a user-requested document from a user-requested one of said marked-up documents using the customized formatting specification and that modifies words or characters of the requested one of said marked-up documents according to said customized formatting specification such that the user-requested document includes a visual formatting not present in the unmarked-up document corresponding to said user-requested marked-up document, at least some of said visual formatting representing the implicit linguistic or phonetic content, wherein the visual formatting includes additional visible indicators applied to the words forming cues to thereby aid reading of the document.

8. The system of claim 7, wherein said formatting specification is such that said generated document comprises a plurality of words that are formatted such that a character at the end of each said word is highlighted compared to a character at the start of said word.

9. The system of claim 7, wherein said formatting specification is such that said generated document comprises a plurality of sentences comprising two or more syntactic phrases, each said sentence being formatted such that at least two of said phrases are formatted in or on at least one of:
different fonts,
differently sized fonts,
different lines, and
different colours.

10. The system of claim 7, wherein said formatting specification is such that each page of said generated document comprises a single narrow column of text, each said column being bounded on either side by a vertical Line.

11. The system of claim 7, wherein the customized formatting specification specifies that the additional visual indicators of the visual formatting include a syllable break glyph positioned between syllables of a multi-syllable word.

12. The system of claim 9, wherein one said sentence is formatted on a separate line.

13. The system of claim 12, wherein each said syntactic phrase is indented on said line according to the syntactic significance of said, syntactic phrase.

14. The system of claim 7, wherein the formatting specification defines one of a predetermined plurality of geometric patterns imparted to the lines, characters, syllables, or words in the generated user-requested document, or is dependent on the linguistic or phonetic content.

15. A method of producing and distributing documents comprising the steps of:
marking-up unmarked-up documents according to a schema, thereby generating marked-up documents, each marked-up document having explicit structural Information corresponding to implicit, linguistic or phonetic content of words in a corresponding one of said unmarked-up documents;
receiving a user request for one of said marked-up documents, said user request including customized formatting information;
generating a user-requested formatted document from said marked-up document using said customized formatting information and said explicit structural information, at least some of the words and/or characters of the generated user-requested formatted document having a visual formatting corresponding to said customized formatting information and different from the corresponding unmarked-up document, and at least some of said visual formatting representing said implicit linguistic or phonetic content, wherein the visual formatting includes additional visible indicators applied to the words forming cues to thereby aid reading of the document.

16. The system of claim 7, wherein:
the format storage medium stores multiple formatting specifications; and
the document production processor is adapted to receive an indication of a user-selected one of the formatting specifications and to generate the user-requested document using the user-selected one of the formatting specifications.

17. The method of claim 15, wherein:
receiving the user request includes receiving a user selection of one of a plurality of stored formatting specifications; and
generating the user-requested formatted document with said visual formatting includes applying said user-selected formatting specification based on the explicit structural information contained in said marked-up document to thereby generate said visual formatting to expressly represent said implicit linguistic or phonetic content.

18. The method of claim 15, wherein the additional visible indicators include a syllable break glyph positioned between syllables of a multi-syllable word.

* * * * *